(No Model.)

R. ABBOTT.
DISH COVER.

No. 508,198. Patented Nov. 7, 1893.

Witnesses
Jas. S. Smith
Chas. F. Benjamin

Inventor:
Robert Abbott
By Richard McAllister,
His Attorney

UNITED STATES PATENT OFFICE.

ROBERT ABBOTT, OF PORTSMOUTH, OHIO, ASSIGNOR OF ONE-HALF TO THOMAS YORK, OF SAME PLACE.

DISH-COVER.

SPECIFICATION forming part of Letters Patent No. 508,198, dated November 7, 1893.

Application filed July 20, 1893. Serial No. 481,033. (No model.)

*To all whom it may concern:*

Be it known that I, ROBERT ABBOTT, a citizen of the United States, residing at Portsmouth, in the county of Scioto and State of Ohio, have invented certain new and useful Improvements in Dish-Covers; and I do hereby declare the following to be a full, clear, and exact description of the invention, such as will enable others skilled in the art to which it appertains to make and use the same.

This invention relates to that class of covers for dishes, jars and other vessels for kitchen, table and domestic use, that are designed to cool the contents of such vessels, by evaporation of water contained within the cover, which, to that end, is made of clay or other porous material.

Figure 1:
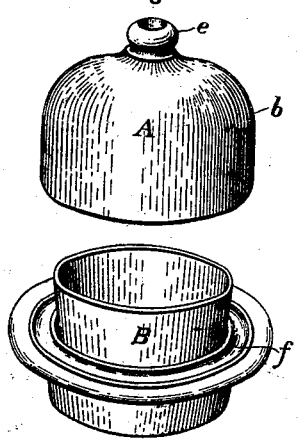
Figure 2:
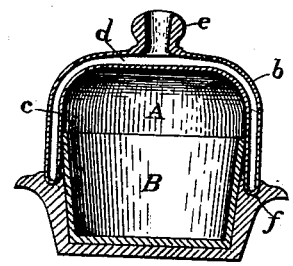

In the accompanying drawings, wherein like letters represent like parts, Figure 1 is a perspective of a cover embodying the invention in company with the dish to which it is fitted. Fig. 2 is a vertical section through the center of such a cover and of the upper part of the vessel to which it is fitted, and Fig. 3, a similar view, showing the cover fitted within the rim of the vessel.

A represents the cover; b, the outer wall thereof; c, the inner wall thereof; d, the water space between the two walls, which is formed by so molding the plastic material whereof the cover is made, as to provide whatever space between the two walls is deemed necessary or desirable, and curving the material at the rim, otherwise the bottom edge, so as to keep the walls integral and therefore leakage-tight around that line of junction. The cover is finished off at the top with a hollow knob, e, which serves the double purpose of a handle and a feed tube, the channel of the knob communicating with the water space between the walls.

Figure 3:
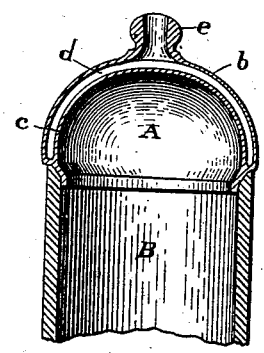

B represents the upper portion of a vessel to which the cover is to be fitted, and is provided with a groove, f, to receive and hold the cover. In some vessels, as, for instance, a water cooler, it may be convenient to secure the cover in place by giving an inward curve to its lower part, and so letting it descend a short distance into the vessel, as shown in Fig. 3 of the drawings. The plastic and porous material for the molding of this double-walled cover is to be so prepared as to effect the most rapid evaporation of the water supplied to it without objectionable leakage, and in forming the double wall care is to be taken to leave the largest practicable dome space beneath the inner wall for the play of the current of cold air produced by the evaporation of the water inclosed by the cover.

I am aware that covers for domestic vessels or utensils have been used for cooling purposes, in which practically a double walled cover, made integrally throughout, with dome space beneath, has been fitted into the rim of and in combination with the vessel or utensil containing the substance to be cooled, as shown in the patent to Dorlon, numbered 235,857 among United States patents. But I know of no such cover or combination wherein the material chosen and the effect designed result in producing the desired refrigerative action or condition by evaporation of water at a normal temperature through the porous texture of the cover containing such water, which is the new and useful result accomplished by my inventive construction and arrangement.

I claim—

The combination of a dish or jar, having a grooved rim at or near its upper edge, with the double walled cover, made integrally of porous clay; having a water space between the walls, and provided with a knob having a channel in communication with the water space; all substantially as and for the purposes described, whereby the contents of said dish or jar are cooled by the evaporation of water at a normal temperature through the porous texture of the said cover, as hereinbefore set forth.

In testimony whereof I affix my signature, in presence of two witnesses, this 5th day of June, 1893.

ROBERT ABBOTT.

Witnesses:
JOSEPH BALL,
MANSFIELD SUMNER.